United States Patent
Kawate et al.

(10) Patent No.: US 6,433,554 B1
(45) Date of Patent: Aug. 13, 2002

(54) METHOD AND APPARATUS FOR IN-RANGE FAULT DETECTION OF CONDITION RESPONSIVE SENSOR

(75) Inventors: Keith W. Kawate, North Attleboro; David L. Corkum, Attleboro; Thomas R. Maher, Rehoboth, all of MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/468,260

(22) Filed: Dec. 20, 1999

(51) Int. Cl.[7] .................. G01R 31/00; G01R 31/08; G01R 27/02; G01R 27/08
(52) U.S. Cl. .................. 324/500; 324/526; 324/610; 324/706; 324/705
(58) Field of Search .................. 324/651, 706, 324/725, 98, 101, 526, 601, 607, 670, 610; 73/1.01

(56) References Cited

U.S. PATENT DOCUMENTS

| | | | |
|---|---|---|---|
| 3,611,130 A | * 10/1971 | Larsen et al. | 324/106 |
| 5,055,269 A | * 10/1991 | Palumbo et al. | 324/706 X |
| 5,185,607 A | * 2/1993 | Lyon et al. | 341/120 |
| 5,440,234 A | * 8/1995 | Kondo | 324/706 |
| 6,040,779 A | * 3/2000 | Pfaff et al. | 324/706 X |
| 6,118,278 A | * 9/2000 | Rother | 324/526 |
| 6,304,074 B1 | * 10/2001 | Waffenschmidt | 324/202 |

FOREIGN PATENT DOCUMENTS

| | | |
|---|---|---|
| DE | 2057699 | 5/1972 |
| DE | 19806753 A1 | 2/1999 |
| GB | 2334588 A | 8/1999 |
| WO | WO 9901777 | 1/1999 |

* cited by examiner

Primary Examiner—N. Le
Assistant Examiner—Anjan K. Deb
(74) Attorney, Agent, or Firm—Russell E. Baumann; Frederick J. Telecky, Jr.

(57) ABSTRACT

An in-range fault detection system for a full wheatstone bridge element (12) having piezoresistive elements (R1, R2, R3, R4) has bridge outputs (INP, INM) connected to measuring means in the form of a first circuit portion (13) to provide a common mode voltage ($V_{CM}$). A second circuit portion (14) is used to provide a centering voltage ($C^*V_{BRG}$) equal to the common mode voltage at the time of sensor calibration and a third circuit portion (15) is used to provide a small window voltage ($W^*V_{BRG}$) which is a fraction of bridge voltage. The value ($W^*V_{BRG}$) is subtracted from ($C^*V_{BRG}$) at a first summing circuit (SUM1) and added to ($C^*V_{BRG}$) at a second summing circuit (SUM2) and the results are each compared to the common mode voltage by comparators (Q1, Q2) which are then determined to be within or without a window of valid values by an OR gate (Q3).

13 Claims, 8 Drawing Sheets

METHOD AND APPARATUS FOR IN-RANGE FAULT DETECTION OF CONDITION RESPONSIVE SENSOR

FIELD OF THE INVENTION

This invention relates generally to condition responsive sensors having a full bridge circuit such as a bridge circuit comprising piezoresistive elements and more particularly to apparatus and methods for providing fault detection which enables detection of errors in either the offset or sensitivity of a sensor that can be smaller than a full scale output signal.

BACKGROUND OF THE INVENTION

Bridge circuit sensors are widely used to sense a change in a certain condition, such as a change in pressure or a change in acceleration. A common bridge circuit sensor comprises piezoresistive elements mounted on a substrate, such as silicon, so that changes in the sensed condition causes a change in stress induced in the several piezoresistive elements to provide an output of the bridge which is a function of the change in the sensed condition. Typical uses include acceleration sensors for use in automotive braking systems and pressure sensors for use in automotive fuel injection systems, by way of example. There is a continuing need, in many applications, to minimize costs associated with the sensors while at the same time providing detectivity of sensor flaws which can result in an erroneous in-range sensor output. It is known to use redundant sensors to add to the reliability of a system; however, this adds to the cost of the system. It is desired to provide a single sensor system in which the user is alerted in the event of a malfunction of sensor operation.

In PCT application, International publication number WO99/01777, dated Jan. 14, 1999, a circuit is disclosed for monitoring the function of a full wheatstone piezoresistive sensor bridge circuit. If the compared signals deviate by more than an acceptable amount the output of a comparator provides an alarm signal. The disclosed circuit monitors to some extent the bridge resistors as well as the connectivity to an ASIC. However, the cited prior art is complex and is relatively expensive due to its implementation size. The approach in the cited prior art requires two separate conditioning circuits which must be precisely adjusted and stable over time and temperature.

SUMMARY OF THE INVENTION

An object of the present invention is the provision of a method and circuit for detecting faults in a bridge circuit sensor simpler and more cost effective than the above noted prior art. Another object of the invention is the provision of an in-range fault protection system for providing an alarm whenever a fault occurs in a full bridge sensor. Yet another object of the invention is the provision of an in-range fault protection system for a full wheatstone piezoresistive bridge type sensor suitable for fabricating in the form of an integrated circuit which is reliable yet low in cost. Yet another object of the invention is the provision of such a system which can be used for other full bridge arrangements, such as a bridge containing capacitive elements.

Briefly described, the fault detection system made in accordance with the invention comprises circuitry connected to the outputs of an energized full wheatstone bridge to provide a means to generate a common mode voltage of the bridge outputs during sensor calibration which is then compared to threshold voltages to determine a fault status during normal operation. The common mode voltage of the full bridge outputs is defined as the voltage equal to a linear combination of the bridge output voltages which is insensitive to stimulus applied to the full bridge and is within the voltage range between the two bridge outputs. Circuit parameters that define the common mode voltage and fault comparator thresholds are appropriately adjusted and stored in nonvolatile memory.

BRIEF DESCRIPTION OF DRAWINGS

Other objects, advantages and details of the sensor of the invention and method for providing in-range fault detection appear in the following detailed description of preferred embodiments of the invention, the detailed description referring to the following drawings in which.

DETAILED DESCRIPTION OF THE PREFERRED EMBODIMENTS

Figure 1:
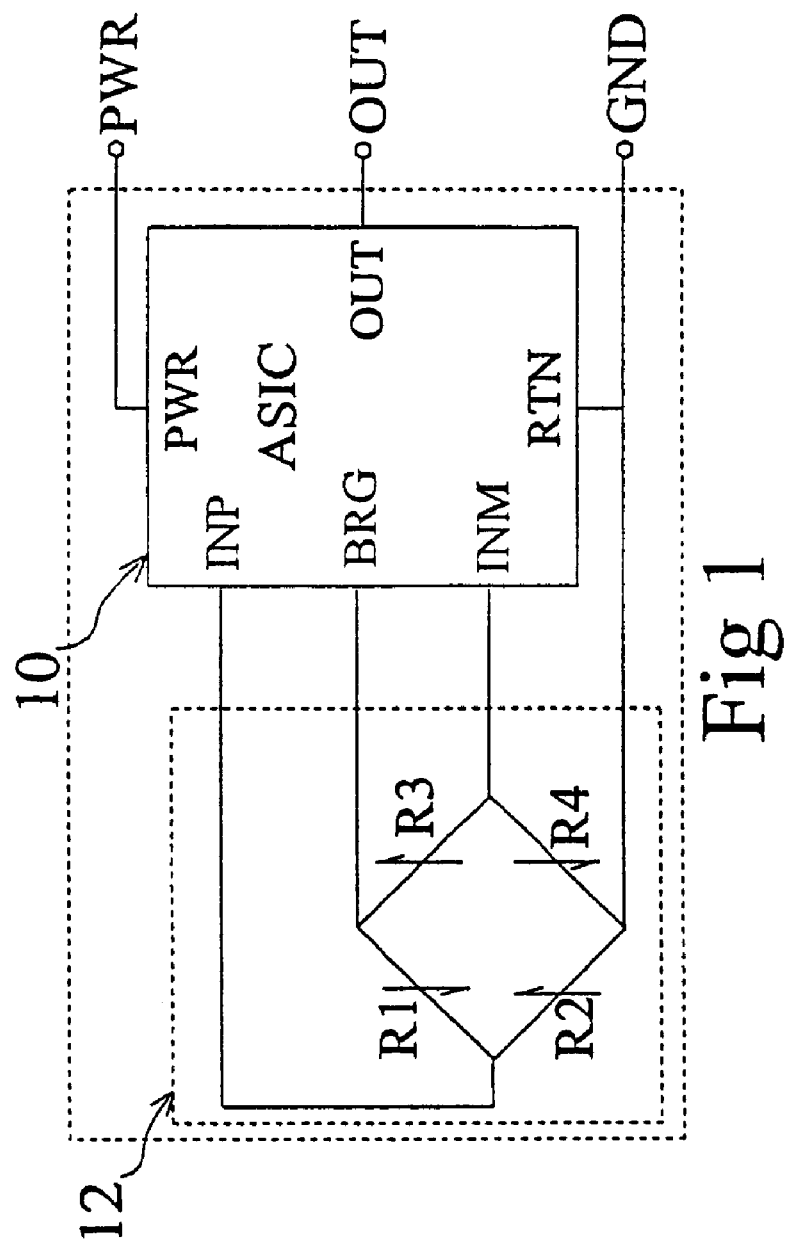
FIG. 1 is schematic of a full wheatstone bridge sensor element and an ASIC embodying a circuit made in accordance with the invention.

With reference to FIG. 1, a piezoresistive sensor conditioner application specific, integrated circuit (ASIC) 10 is shown along with a piezoresistive sensor element 12 made in accordance with a preferred embodiment of the invention. ASIC 10 will convert small changes in the off-chip piezoresistors of sensor element 12 to large changes in the ASIC supply-ratiometric output voltage. Four piezoresistors R1–R4 are arranged in a full wheatstone bridge, in externally connected sensing element 12. The value of resistors R1–R4 vary in response to the application of a mechanical stimulus such as pressure used in various applications including automotive under-hood applications such as fuel injection systems. ASIC 10 has nodes BRG, INP, INM, and RTN for connection to nodes of sensor element 12 in turn connected to resistors R1–R4 of sensor element 12 as well as nodes PWR, OUT, and RTN for external connection of power and the sensor output.

Figure 2:
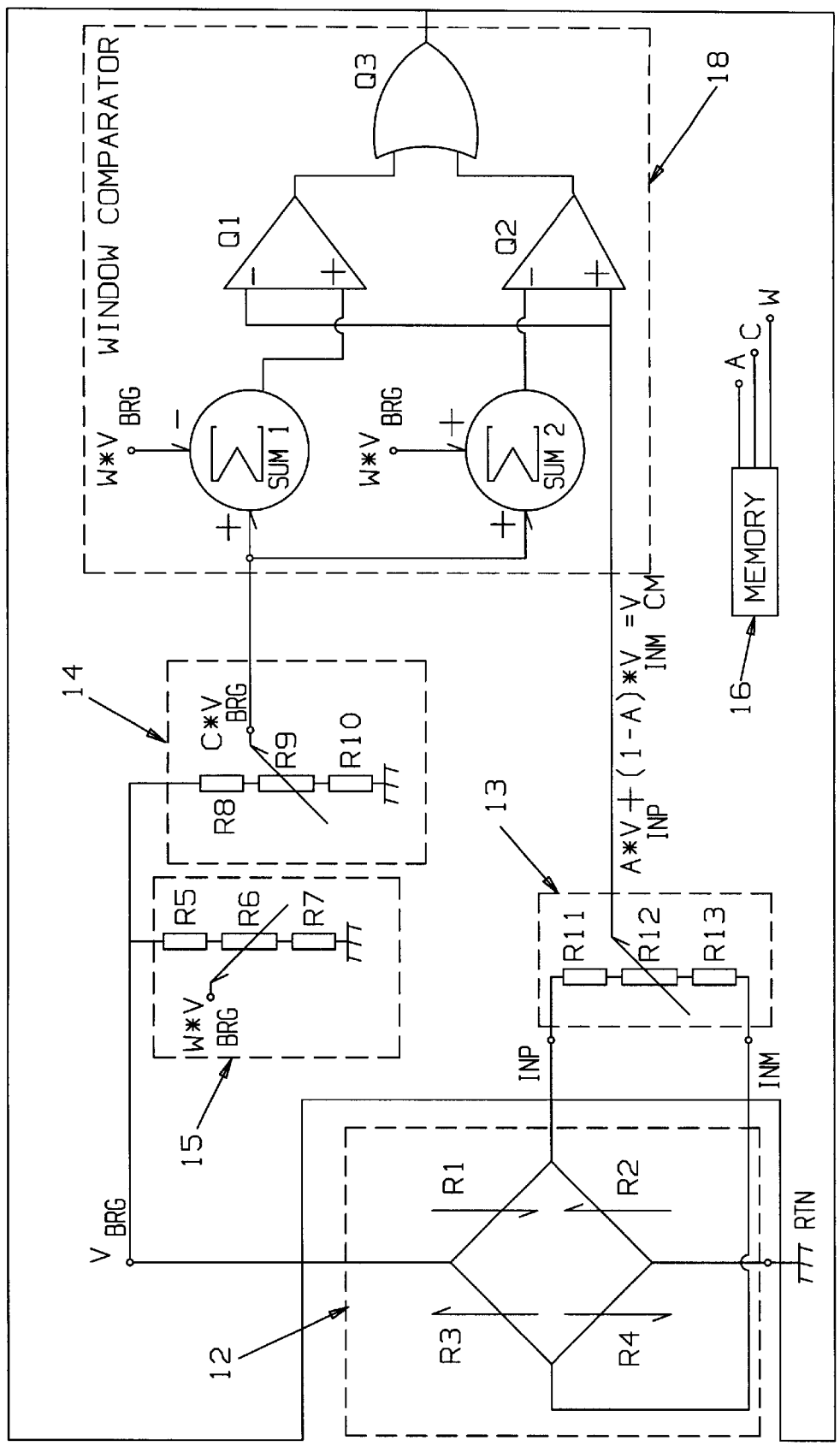
FIG. 2 is a schematic of the common mode fault detection circuit portion of the FIG. 1 ASIC showing circuit portions for providing common mode voltage and fault comparator thresholds.

In accordance with the preferred embodiment of the invention, common mode voltage, $V_{CM}$, is obtained using a circuit portion 13 connected between the bridge voltage output connections INP, INM. As will be explained in greater detail below, voltage $C_{CM}$ is equal to $A*V_{INP}+(1-A)*V_{INM}$. In the FIG. 2 embodiment, circuit portion 13 comprises a first DAC made up of resistors R11, R12 and R13. A voltage, $C*V_{BRG}$, is obtained using a circuit portion 14 in the form of a second DAC made up of resistors R8, R9 and R10 and a voltage, $W*V_{BRG}$, is obtained using a third circuit portion 15 in the form of a third DAC made up of resistors R5, R6 and R7. The values of A, C and W are stored in nonvolatile memory 16. The output of circuit portions 13, 14 and 15 are connected to comparator 18, to be discussed below, in order to obtain an indication of the status of a fault condition.

Voltages $C*V_{BRG}$ and $W*V_{BRG}$ are adjusted to provide upper and lower comparator thresholds. If the common mode voltage exceeds these thresholds, then the comparator indicates a fault. The thresholds are typically adjusted to be as close as possible to the common mode voltage to maximize fault detectivity, but are not so close as to cause false fault reporting over time, temperature, and the like.

Fault window width parameter $W*V_{BRG}$ is adjusted to equal a known fraction of the bridge supply voltage. Alternatively, if desired, the fault window width parameter can be made equal to a known fraction of the full scale output. The window width parameter, W is typically adjusted to be as small as possible to maximize fault detectivity. In order to avoid false fault reporting over time, temperature, and the like, the lower limit of the window width parameter is selected to be sufficiently larger than the expected variations in common mode voltage not compensated for during sensor calibration as well as ASIC influences such as calibration error and drift.

Figure 2A:
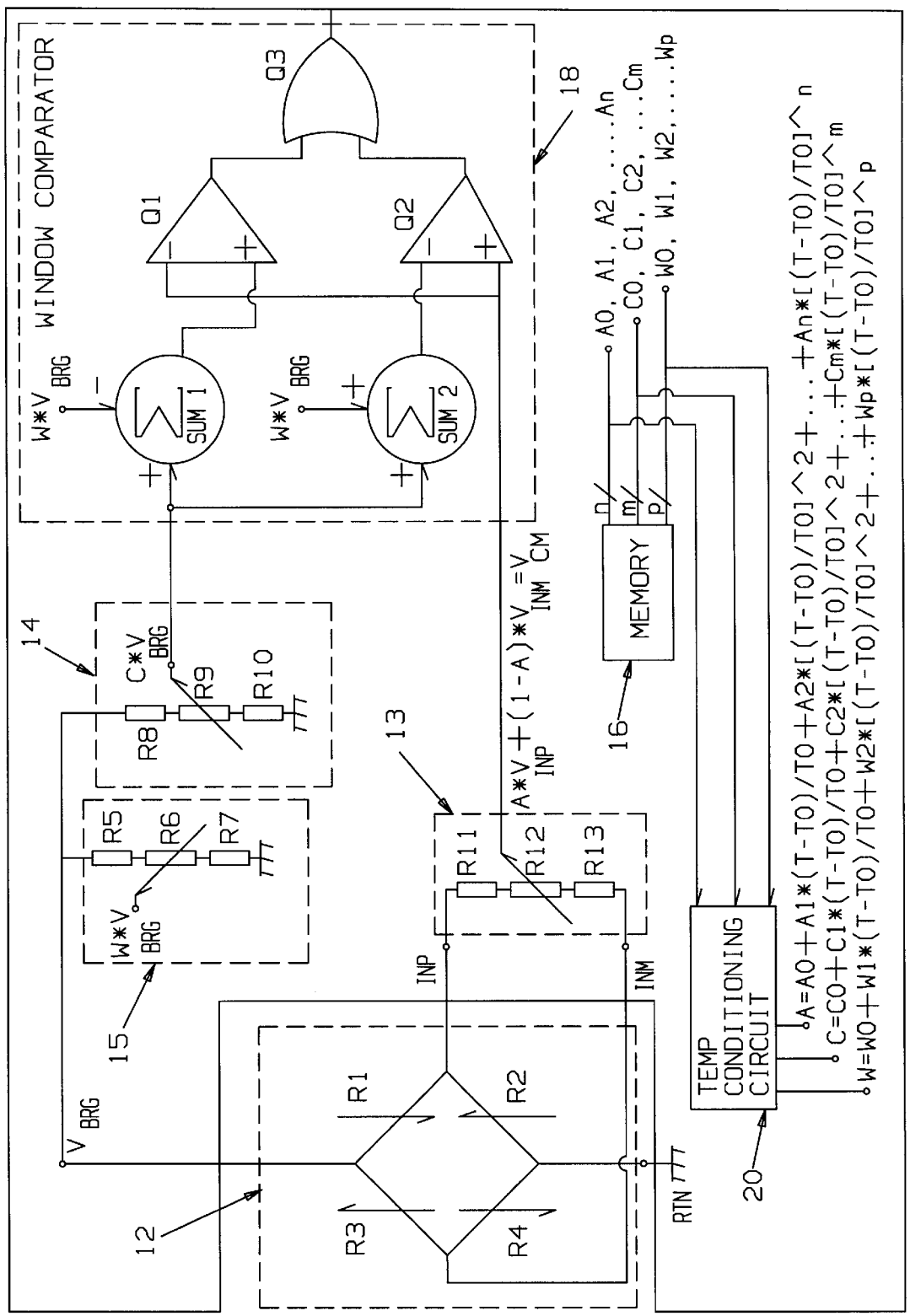
FIG. 2a ia a schematic of a modification of the FIG. 2 structure which includes a temperature compensation circuit for the common mode voltage, window centering voltage and window width voltage.
Figure 3:
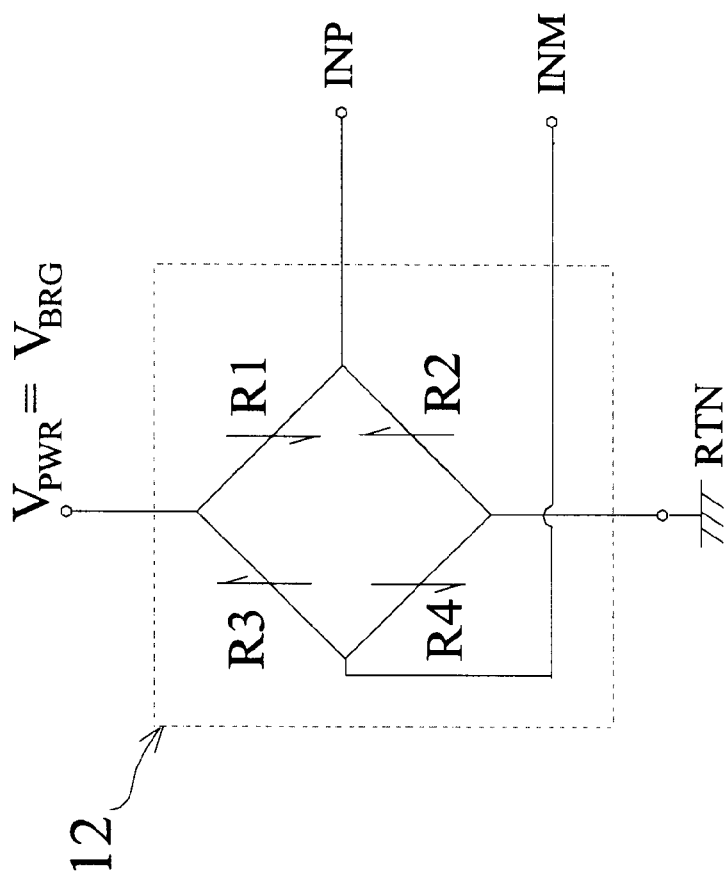
FIG. 3 is a schematic of a portion of the FIG. 1 ASIC showing the full bridge sensor element power source as a voltage source.
Figure 3A:
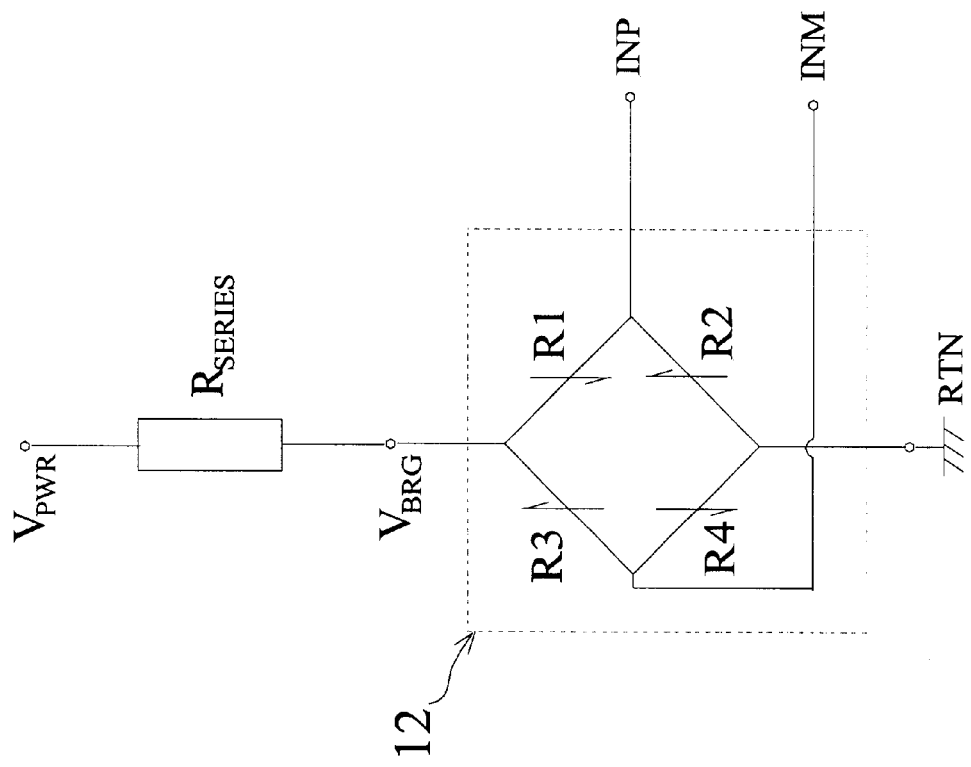
FIG. 3a is a schematic similar to FIG. 3 showing the full bridge sensor element power source as a voltage source and a series resistor.
Figure 3B:
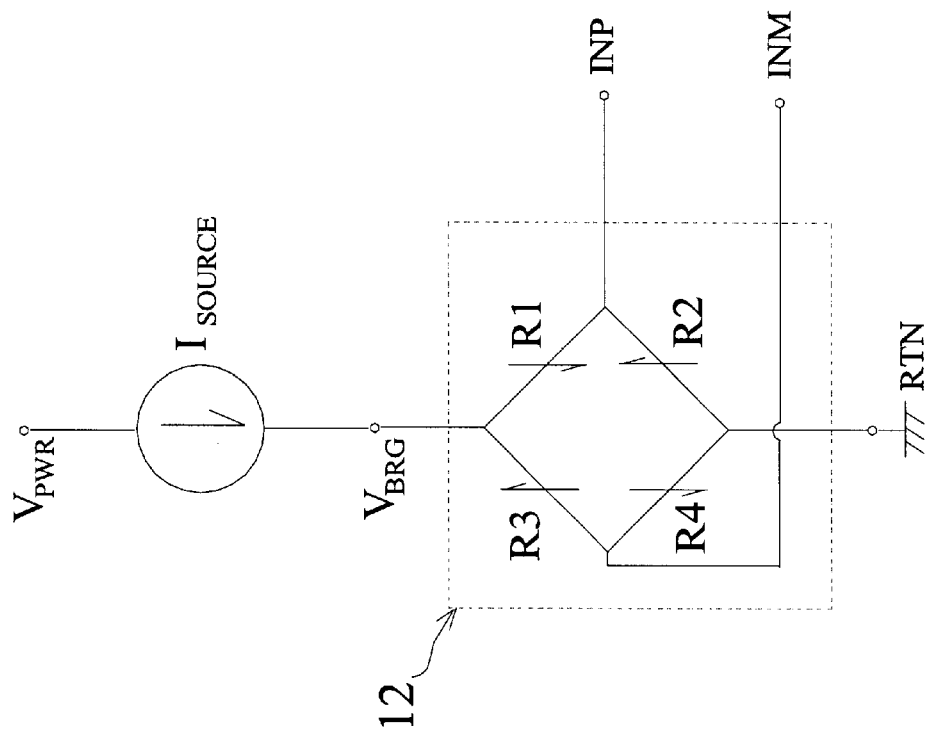
FIG. 3b is a schematic similar to FIG. 3 showing the full bridge sensor element power source as a current source.

Calibration adjustments requiring thermal compensation involve repeating the calibration process at multiple temperatures to set linear and higher order thermal coefficients of compensation. All adjustable parameters are stored in nonvolatile memory 16. Sensors requiring thermal compensation may derive a temperature signal either from a conventional temperature reference on the ASIC as indicated in FIG. 2a, to be discussed, (e.g., a signal related to a bandgap reference voltage) or by a signal related to the sense element temperature. One method to obtain a signal related to the sensor element temperature is to power the sensor element as shown in either FIGS. 3a or 3b and use the temperature variation in $V_{BRG}$, due to the sensor bridge resistance temperature dependence, as the temperature signal. As shown in FIG. 3a, a series resistance, $R_{SERIES}$ is provided having significantly lower thermal variation than the full bridge resistance would cause the bridge voltage $V_{BRG}$ to vary over temperature mainly due to the resistance change in the full bridge resistance. Similarly, as shown in FIG. 3b, a current source, $I_{SOURCE}$ is provided having significantly lower thermal variation than the full bridge resistance would cause the bridge voltage, $V_{BRG}$ to vary over temperature mainly due to the full bridge resistance thermal variation. However, the bridge powering techniques shown in FIGS. 3a and 3b reduce the sensor element 12 signal by the fraction of $V_{BRG}/V_{PWR}$. Embodiments not deriving the temperature signal from the sensor element may employ the bridge powering technique shown in FIG. 3 to maximize sensor signal thereby reducing required ASIC gain.

As noted above, during operation of a calibrated fault detection system made in accordance with a preferred embodiment of the invention, the common mode voltage of the two bridge halves is obtained at circuit portion 13 comprising an adjustable resistor divider tap or first potentiometric DAC output which is serially connected between the bridge output nodes. The setting, A of the first DAC having an output $V_{CM}=\{A*V_{INP}+(1-A)*V_{INM}\}$ is selected such that the common mode voltage is insensitive to applied stimulus to the full bridge. Circuit portion 14 comprising the second DAC connected between the bridge voltage $V_{BRG}$ and analog ground $V_{RTN}$ and circuit portion 15 comprising the third DAC, connected between the bridge voltage and analog ground, produce parameters $W*V_{BRG}$ and $C*V_{BRG}$. The parameter $W*V_{BRG}$ is then subtracted from $C*V_{BRG}$ at a first summing circuit SUM1 and in turn inputted to the positive input of the first comparator Q1 and added to $C*V_{BRG}$ at a second summing circuit SUM2 and in turn inputted to the negative input of the second comparator Q2. The outputs of the comparators Q1 and Q2 are connected to the inputs of a digital logic OR gate Q3 so that if the common mode voltage falls outside the range bounded by $(C-W)*V_{BRG}$ to $(C+W)*V_{BRG}$ a fault is indicated by a logic "1" output of the OR gate Q3. The output of the OR gate Q3 reflects the status of the fault condition so that the user is alerted to a malfunction of the sensor element or its connectivity to the ASIC.

The above embodiment may be further simplified by eliminating certain ASIC adjustments to the common mode fault parameters by carefully controlling or screening bridge parameters which influence the stimulus, time and temperature variability of the bridge common mode voltage. For example, the resistive DAC of circuit portion 13 used to yield the common mode voltage may be replaced by a pair of equal valued resistors (not shown) between the full bridge outputs if the stimulus sensitivities of the two half bridges are matched sufficiently well.

Figure 2B:
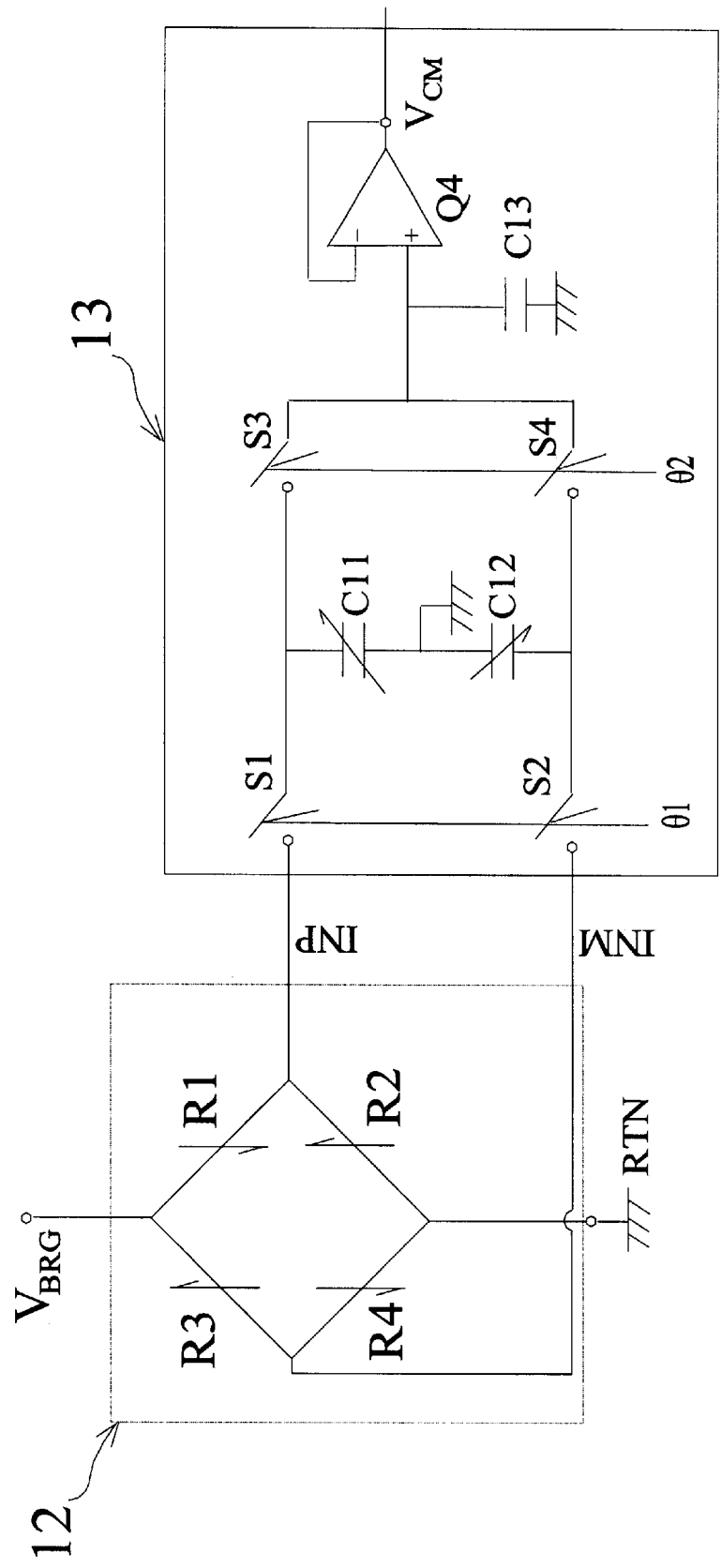
FIG. 2b is schematic of the common mode voltage circuit portion of the common mode fault detection circuit portion of FIG. 2 showing an alternate embodiment of the invention using capacitive DACs for obtaining the common mode voltage.

Alternatively, as shown in FIG. 2b, circuit portion 13 can comprise first and second capacitive DACs C11, C12 coupled to a comparator Q4 to provide common mode voltage $C_{CM}$.

With reference to FIG. 2a, a modified embodiment includes thermal compensation provided by temperature conditioning circuit 20 in which A is equal to $A0+1*(T-T0)/T0+A2*[(T-T0)/T0]^2+ \ldots An*[(T-T0)/T0]^n$; $C=C0+C1*(T-T0)/T0+C2*[T-T0)/T0]^2+ \ldots (m[T-T0)/T0]^m$; and $W=W0+W1*(T-T0)/T0+W2*[T-T0/T0)T0]^2+ \ldots +Wp*[(T-T0)/T0]^p$. Memory 16 has ports n–A0, A1, A2, . . . An; m–C0, C1, C2 . . . Cm; p–W0, W1, W2, . . . Wp interconnected with temperature conditioning circuit 20.

Although a fraction of the bridge supply voltage has been used to provide the threshold voltages, as noted above, it is within the purview of the invention to derive the threshold voltages from the full scale span. Thus, the difference between the upper and lower threshold voltages may be inversely proportional to ASIC gain. During sensor calibration, the thermal compensation coefficients for the threshold difference above may be functionally related to the sensor's stimulus gain thermal compensation coefficients, thereby providing a threshold difference given by a known fraction of full scale output over a defined temperature range.

Figure 2C:
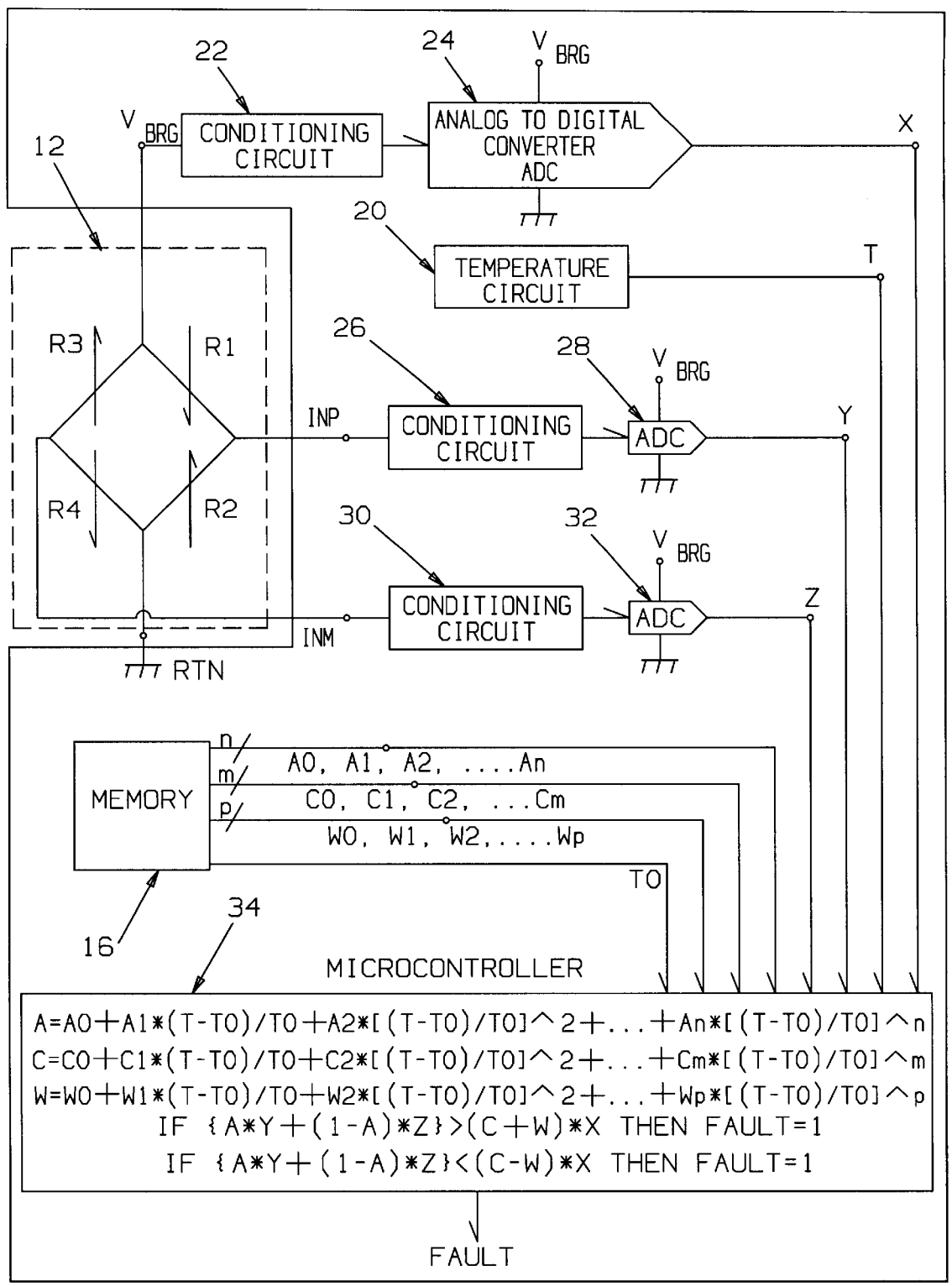
FIG. 2c is a schematic similar to FIG. 2a of a modified embodiment employing analog to digital converters to perform calculations in the digital domain.

In another modified embodiment, digitized analog signals related to the full bridge output and supply voltages can be employed. The digitized data are then evaluated to determine the presence of a fault condition caused by changes in the common mode voltage of the full bridge. With reference to FIG. 2c, conditioning circuit 22 and analog to digital converter 24, connected between voltage $V_{BRG}$ and common, are connected to voltage $V_{BRG}$ and provide a digitized signal at X which is inputted to microcontroller 34. Conditioning circuit 26 and analog to digital converter 28, connected between voltage $V_{BRG}$ and common, are connected to voltage $V_{INP}$ and provide a digitized signal at Y which is inputted to microcontroller 34. Similarly, conditioning circuit 30 and analog to digital converter 32, connected between voltage $V_{BRG}$ and common, are connected to voltage $V_{INM}$ and provide a digitized signal at Z which is inputted to microcontroller 34. The microcontroller performs calculations based on the inputs from X, Y and Z along with values from memory 16: n–A0, A1, A2, . . . An; m–C0, C1, C2, . . . Cm; p–W0, W1, W2 . . . Wp according to the following:

$$A=A0+A1*(T-T0)/T0+A2*[(T-T0)/T0]^2+\ldots+An*\{(T-T0)/T0\}^n$$

$$C=C0+C1*(T-T0)/T0+C2*\{(T-T0)/T0\}^2+\ldots Cm*[(T-T0)/T0]^m$$

$$W=W0+W1*(T-T0)/T0+W2*[(T-T0)/T0]^2+\ldots+Wp*[(T-T0)/T0]^p$$

$$\text{IF}\{A*Y+(1-A)*Z\}>(C+W)*X \text{ THEN FAULT}=1$$

$$\text{IF}\{A*Y+(1-A)*Z\}<(C-W)*X \text{ THEN FAULT}=1$$

It is within the scope of the invention, as shown in FIG. 2b that capacitive dividers and capacitive DACs may be used to generate the necessary signals related to the full bridge voltages. One method to provide generation of the $V_{CM}$ signal using a pair of capacitive DACs comprises hardware and clocking as follows; simultaneously close a pair of switches S1 and S2, while switches S3 and S4 are open, with a clock signal θ1 to store the bridge output voltages $V_{INP}$ and $V_{INM}$ on adjustable capacitors C11 and C12, respectively. Following the settling of the voltages on adjustable capacitors C11 and C12, clock phase θ1 opens switches S1 and S2 between the bridge and capacitors and a brief period later clock signal θ2 simultaneously closes a pair of switches, S3 and S4 to store $C_{CM}$ onto a sample and hold circuit given by a capacitor C13 and an amplifier Q4 in a buffer feedback configuration. The value of capacitor C13 with respect to adjustable capacitors C11 and C12 influences circuit response time. The adjustable capacitors C11 and C12 should be adjusted to yield $C_{CM}$ which is insensitive to stimulus applied to the bridge. If desired, only one of C11 or C12 needs to be made adjustable to accommodate the required $C_{CM}$ trimming. Also, it is obvious and within the purview of the invention to employ a non-unity gain to the amplifier Q4.

It should be understood that although a particular embodiment of the invention has been described by way of illustrating the invention, the invention includes all modifications and equivalents of the disclosed embodiment falling within the scope of the appended claims.

What is claimed:

1. Fault detection apparatus for use with a sensor including a full Wheatstone bridge comprising a first circuit connected between the full Wheatstone bridge output nodes to obtain a voltage signal proportional to the sum of the output voltages, and a second circuit to compare the voltage signal to predetermined voltage thresholds to determine a sensor fault condition.

2. Fault detection apparatus according to claim 1 in which the circuit to yield the voltage signal is adjustable.

3. Fault detection apparatus according to claim 2 in which the circuit to yield the voltage signal comprises a potentiometer resistor string.

4. Fault detection apparatus according to claim 2 in which the circuit to yield the voltage signal comprises at least one capacitive digital-to-analog converter.

5. Fault detection apparatus according to claim 1 in which the thresholds are proportional to the bridge supply voltage.

6. Fault detection apparatus according to claim 5 further comprising a circuit for adjusting the voltage thresholds in a compensating manner with temperature.

7. Fault detection apparatus according to claim 1 in which the voltage signal is an analog signal and further comprising a circuit for digitizing the analog signal and voltage threshold and performing calculations in the digital domain on digitized values of the voltage signal and voltage thresholds to determine a fault condition.

8. Fault detection apparatus according to claim 1 in which the full Wheatstone bridge comprises piezoresistive elements.

9. A method for monitoring faults of a full Wheatstone bridge sensor element and connections thereto, the sensor element having bridge outputs comprising the steps of:

energizing the bridge sensor element with a power source, adjusting a circuit between the outputs of the full Wheatstone bridge sensor element to yield a voltage signal which is proportional to the sum of the bridge output voltages and is highly insensitive to stimulus during sensor calibration, storing the adjusted circuit parameters in memory for setting the voltage signal, comparing the voltage signal to threshold voltages; and setting a fault indication whenever the voltage signal is no longer within the voltage range defined by the threshold voltages.

10. A method according to claim 9 in which the average of the voltage thresholds is equal to the voltage signal at the time of the sensor calibration.

11. A method according to claim 9 in which the bridge sensor element is supplied with a voltage source.

12. A method according to claim 9 in which the bridge sensor element is supplied with a voltage source through a series resistor.

13. A method according to claim 9 in which the bridge sensor element is supplied with a current source.

* * * * *